(12) United States Patent
Wuillaume et al.

(10) Patent No.: US 9,776,915 B2
(45) Date of Patent: *Oct. 3, 2017

(54) IG WINDOW UNIT INCLUDING DOUBLE SILVER COATING HAVING INCREASED SHGC TO U-VALUE RATIO, AND CORRESPONDING COATED ARTICLE FOR USE IN IG WINDOW UNIT OR OTHER WINDOW

(71) Applicant: Guardian Industries Corp., Auburn Hills, MI (US)

(72) Inventors: Francis Wuillaume, Plymouth, MI (US); Brent Boyce, Novi, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,595

(22) Filed: Jan. 19, 2017

(65) Prior Publication Data

US 2017/0129808 A1    May 11, 2017

Related U.S. Application Data

(63) Continuation of application No. 15/077,279, filed on Mar. 22, 2016, now Pat. No. 9,556,070, which is a (Continued)

(51) Int. Cl.
*B32B 15/04* (2006.01)
*B32B 17/06* (2006.01)
(Continued)

(52) U.S. Cl.
CPC ........ *C03C 17/3681* (2013.01); *C03C 17/366* (2013.01); *C03C 17/3626* (2013.01);
(Continued)

(58) Field of Classification Search
USPC ....... 428/426, 428, 432, 433, 434, 688, 689, 428/697, 699, 701, 702
See application file for complete search history.

(56) References Cited

U.S. PATENT DOCUMENTS 5,948,538 A * 9/1999 Brochot .................. C03C 17/36
359/359
6,042,934 A    3/2000 Guiselin
(Continued)

OTHER PUBLICATIONS

U.S. Appl. No. 15/077,279, filed Mar. 22, 2016; Wuillaume et al.
U.S. Appl. No. 14/592,970, filed Jan. 9, 2015; Wuillaume et al.
U.S. Appl. No. 14/016,282, filed Sep. 3, 2013; Wuillaume et al.

*Primary Examiner* — Lauren R Colgan
(74) *Attorney, Agent, or Firm* — Nixon & Vanderhye P.C.

(57) ABSTRACT

An insulating glass (IG) window unit includes first and second substrates, and a low-emissivity (low-E) coating supported by one of the substrates. The low-E coating has two silver based infrared (IR) reflecting layers and allows the IG window unit to realize an increased SHGC to U-value ratio, and an increased thickness ratio of an upper silver based layer of the coating to a bottom silver based layer of the coating. The low-E coating is designed to have a low film-side reflectance, so that for example when the low-E coating is used on surface number three of an IG window unit the IG window unit can realize reduced visible reflectance as viewed from the outside of the building on which the IG window unit is mounted or is to be mounted.

9 Claims, 3 Drawing Sheets

Related U.S. Application Data continuation of application No. 14/592,970, filed on Jan. 9, 2015, now Pat. No. 9,302,936, which is a continuation of application No. 14/016,282, filed on Sep. 3, 2013, now Pat. No. 8,940,400.

(51) Int. Cl.
  *C03C 17/36* (2006.01)
  *E06B 3/67* (2006.01)
  *E06B 9/24* (2006.01)

(52) U.S. Cl.
  CPC ...... *C03C 17/3639* (2013.01); *C03C 17/3644* (2013.01); *E06B 3/67* (2013.01); *E06B 9/24* (2013.01); *C03C 2217/211* (2013.01); *C03C 2217/212* (2013.01); *C03C 2217/216* (2013.01); *C03C 2217/228* (2013.01); *C03C 2217/281* (2013.01); *C03C 2218/154* (2013.01); *E06B 2009/2417* (2013.01)

(56) References Cited

U.S. PATENT DOCUMENTS

| | | | |
|---|---|---|---|
| 6,287,675 B1 | 9/2001 | Guiselin et al. | |
| 6,673,427 B2 | 1/2004 | Guiselin et al. | |
| 6,833,194 B1 | 12/2004 | O'Shaughnessy | |
| 7,192,647 B2 | 3/2007 | Hartig | |
| 7,241,506 B2 | 7/2007 | Hartig | |
| 7,452,603 B2 | 11/2008 | Fleury et al. | |
| 7,771,830 B2 | 8/2010 | Neuman et al. | |
| 7,964,284 B2 | 6/2011 | Blacker et al. | |
| 8,124,237 B2 | 2/2012 | Nunez-Regueiro et al. | |
| 8,142,622 B2 | 3/2012 | Ferreira et al. | |
| 8,226,803 B2 | 7/2012 | Neuman et al. | |
| 8,283,059 B2 | 10/2012 | Hartig | |
| 8,298,678 B2 | 10/2012 | Lingle et al. | |
| 8,337,988 B2 | 12/2012 | Knoll et al. | |
| 8,357,458 B2 | 1/2013 | Nunez-Regueiro et al. | |
| 8,409,717 B2 | 4/2013 | Lao et al. | |
| 8,440,310 B2 | 5/2013 | Ferreira et al. | |
| 8,940,400 B1 | 1/2015 | Wuillaume et al. | |
| 9,302,936 B2 | 4/2016 | Wuillaume et al. | |
| 9,556,070 B2 | 1/2017 | Wuillaume et al. | |
| 2002/0102352 A1 | 8/2002 | Hartig | |
| 2002/0136905 A1* | 9/2002 | Medwick | C03C 17/36 428/432 |
| 2003/0049464 A1 | 3/2003 | Glenn et al. | |
| 2003/0150711 A1* | 8/2003 | Laird | C03C 17/36 204/192.11 |
| 2004/0005467 A1* | 1/2004 | Neuman | B32B 17/10174 428/432 |
| 2004/0086723 A1* | 5/2004 | Thomsen | C03C 17/36 428/426 |
| 2007/0116965 A1 | 5/2007 | Medwick et al. | |
| 2007/0116967 A1 | 5/2007 | Medwick et al. | |
| 2007/0237980 A1* | 10/2007 | Hartig | C03C 17/36 428/623 |
| 2007/0248791 A1* | 10/2007 | Hartig | C03C 17/36 428/98 |
| 2008/0187692 A1 | 8/2008 | Roquiny et al. | |
| 2009/0263596 A1 | 10/2009 | Lao et al. | |
| 2010/0279144 A1* | 11/2010 | Frank | C03C 17/36 428/623 |
| 2010/0295330 A1* | 11/2010 | Ferreira | B32B 17/10036 296/84.1 |
| 2011/0261442 A1 | 10/2011 | Knoll et al. | |
| 2012/0141806 A1 | 6/2012 | Nunez-Regueiro et al. | |
| 2012/0219821 A1 | 8/2012 | Frank et al. | |
| 2012/0225224 A1 | 9/2012 | Blacker et al. | |
| 2013/0029121 A1 | 1/2013 | Hartig | |
| 2013/0118673 A1 | 5/2013 | Frank et al. | |
| 2013/0164464 A1 | 6/2013 | Lage et al. | |
| 2013/0251923 A1 | 9/2013 | Lao et al. | |
| 2014/0141259 A1 | 5/2014 | Imran et al. | |
| 2014/0141261 A1 | 5/2014 | Imran et al. | |

* cited by examiner

IG WINDOW UNIT INCLUDING DOUBLE SILVER COATING HAVING INCREASED SHGC TO U-VALUE RATIO, AND CORRESPONDING COATED ARTICLE FOR USE IN IG WINDOW UNIT OR OTHER WINDOW

This application is a continuation of application Ser. No. 15/077,279, filed Mar. 22, 2016 (now U.S. Pat. No. 9,556,070), which is a continuation of application Ser. No. 14/592,970, filed Jan. 9, 2015, (now Pat. No. 9,302,936), which is a continuation of application Ser. No. 14/016,282 filed Sep. 3, 2013 (now Pat. No. 8,940,400), the entire disclosures of which are all hereby incorporated herein by reference in this application.

Certain embodiments of this invention relate to an insulating glass (IG) window unit including a low-emissivity (low-E) coating supported by a substrate such as a glass substrate, and/or to a corresponding coated article including a low-E coating supported by a glass substrate for use in the IG or other window unit. In certain example embodiments of this invention, the low-E coating is designed so as to allow the IG window unit to realize an increased SHGC to U-value ratio, and an increased thickness ratio of an upper silver based layer of the coating to a bottom silver based layer of the coating. In certain example embodiments, the low-E coating is designed to have a low film-side reflectance, so that for example when the low-E coating is used on surface number three of an IG window unit the IG window unit can realize reduced visible reflectance as viewed from the outside of the building on which the IG window unit is mounted or is to be mounted. In certain example embodiments, the coated article may or may not be heat treated (e.g., thermally tempered, heat bent and/or heat strengthened).

BACKGROUND OF THE INVENTION

Coated articles are known in the art for use in window applications such as vehicle windshields, insulating glass (IG) window units, monolithic vehicle windows, and/or the like.

U-value (sometimes referred to as U-factor) is a measure of heat loss in a building element such as a wall, floor, window or roof. It can also be referred to as an overall heat transfer co-efficient and measures how well parts of a building transfer heat. This means that the higher the U-value the worse the thermal performance of the building envelope. A low U-value usually indicates high levels of insulation. In other words, U-value measures how well a product prevents heat from escaping a home or building. The lower the U-value, the better a product is at keeping heat inside the building. U-value herein is measured in units of BTU/hr-ft$^2$-° F.), and is calculated according to NFRC 2010 (which includes NFRC 100-2010 Winter) at the center of the glazing (COG). U-value as used herein refers to winter/night U-value.

Solar Heat Gain Coefficient (SHGC) measures how much heat from the sun is blocked. SHGC is expressed as a number between 0 and 1. The lower the SHGC, the more a product is blocking solar heat gain. Blocking solar heat gain is particularly important during the summer cooling season in hot climates. However, people in colder climates may want solar heat gain during the cold winter months to lessen the cost of heating the home. SHGC herein is calculated according to NFRC 2010. SHGC values herein are measured in the out→in context of the IG window unit unless stated otherwise.

Coated articles may or may not be heat treated. The heat treatment (HT) of such coated articles typically requires the use of temperature(s) of at least 580 degrees C., more preferably of at least about 600 degrees C. and often at least 620 degrees C., for about 5-10 minutes or more, such as for thermal tempering or the like. The terms "heat treatment" and "heat treating" as used herein mean heating the article to a temperature sufficient to achieve thermal tempering, heat bending, and/or heat strengthening of the glass inclusive coated article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes or more.

BRIEF SUMMARY OF EXAMPLE EMBODIMENTS OF THE INVENTION

It is desirable in regions having colder climates (e.g., Canada, Scandinavia, Northern United States, etc.) to have windows with a low-E coating which can realize one or more of and preferably a combination of all of: (i) an IG window unit having high visible transmission such as at least about 70%, (ii) an IG window unit having a high SHGC value such as at least 0.50, more preferably at least 0.52, even more preferably at least 0.54 or 0.56, with an example ranges being from about 0.50 to 0.60, in the out→in context of the IG window unit when the low-E coating is on surface three of the IG window unit as shown in FIG. 2, (iii) an IG window unit having a low outdoor/outside reflectance such as no greater than 15%, such as the low-E coating realizing low film-side reflectance when used on surface three of an IG window unit so that reflectance as viewed from the outside of the building is small, (iv) low emissivity and/or low sheet resistance, such as normal emissivity of no greater than 4% and more preferably no greater than 3%, (v) an IG window unit having an acceptable U-value such as a double glazing IG window unit with one low-E coating having a U-value of no greater than 0.253 BTU/hr-ft$^2$-° F., more preferably no greater than 0.251 BTU/hr-ft$^2$-° F., even more preferably no greater than 0.249 BTU/hr-ft$^2$-° F., even more preferably no greater than 0.248 BTU/hr-ft$^2$-° F., with an example range being from 0.244 to 0.253, more preferably from 0.244 to 0.251 BTU/hr-ft$^2$-° F., and (vi) a high SHGC to U-value ratio, calculated as SHGC/U-Value, of at least 2.0, more preferably of at least 2.10, even more preferably of at least 2.15, even more preferably of at least 2.20, and most preferably of at least 2.21, and most preferably of at least 2.24.

Conventional double silver low-E coatings (i.e., low-E coatings having two silver-based IR reflecting layers, in addition to other layers such as dielectric layers) have been developed to increase Light to Solar Gain (LSG) coefficient, meaning that the ratio of transmitted light over transmission of solar energy is maximized. Common LSG ratios of double silver low-E coatings range from 1.6 to 1.8, while the thermal insulation coefficient (U-value) of some is between 0.244 and 0.252. Most double silver coatings have the thicknesses of the silver layers nearly similar, with ratios of upper to lower Ag from 0.8 to 1.2. However, conventional double silver low-E coatings have low SHGC values and often high film-side reflectance and thus are undesirable in cold climates. For example, U.S. Pat. No. 8,142,622 teaches that low SHGC values are desirable and achieved with double-silver low-E coatings, thereby teaching away from the instant invention.

Conversely, conventional single Ag coatings (i.e., a low-E coating having just one silver-based IR reflecting layer, in addition to other layers such as dielectric layers) have been able to realize maximum solar transmission while maintaining acceptable U-value from 0.260 to 0.280 BTU/hr-ft$^2$-° F. While increasing the Ag layer thickness can improve the U-value, it would undesirably decrease the Solar Heat Gain Coefficient (SHGC) and increase visible reflection (e.g., film side reflectance) which can both be undesirable. These coatings provide the current preferred solutions for cold climates and perform best per Quebec standards and requirements, though the U-value is greater than that of double silver coatings. However, in cold climates it is often desired to have a high SHGC, and it is also often desirable to have relatively low film-side reflectance for a coating so that the coating may be used on surface number three of an IG window unit, so that passive heat from the sun can makes its way into the building in order to help heat the building. Accordingly, conventional single silver low-E coatings cannot achieve a combination of a high SHGC to U-value ratio together with a low U-value and a low film-side reflectance. U.S. Pat. No. 8,409,717 discloses a single silver low-E coating, but it has undesirably high U-values. In particular, FIG. 3 of U.S. Pat. No. 8,409,717 shows that an IG window unit with this single silver coating suffers from high U-values of from 0.271 to 0.280.

Thus, it will be apparent that there is a need in the art for a window with a low-E coating that can realize one or more of, more preferably at least four or five of, and most preferably all six of: (i) an IG window unit having high visible transmission such as at least about 70%, (ii) an IG window unit having a high SHGC value such as at least 0.50, more preferably at least 0.52, even more preferably at least 0.54, even more preferably at least 0.56, with an example range being from about 0.50 to 0.60, in the out→in context of the IG window unit when the low-E coating is on surface three of the IG window unit as shown in FIG. 2, (iii) an IG window unit having a low outdoor/outside visible reflectance such as no greater than 15%, such as the low-E coating realizing low film-side reflectance when used on surface three of an IG window unit so that reflectance as viewed from the outside of the building is small, (iv) low emissivity and/or low sheet resistance, such as normal emissivity of no greater than 4% and more preferably no greater than 3%, (v) an IG window unit having an acceptable U-value such as a double glazing IG window unit with one low-E coating having a U-value of no greater than about 0.253 BTU/hr-ft$^2$-° F., more preferably no greater than about 0.251 BTU/hr-ft$^2$-° F., more preferably no greater than about 0.249, with an example range being from 0.244 to 0.253, more preferably from about 0.244 to 0.251 BTU/hr-ft$^2$-° F., and (vi) a high SHGC to U-value ratio, calculated as SHGC/U-Value, of at least 2.0, more preferably of at least 2.10, even more preferably of at least 2.15, even more preferably of at least 2.20, more preferably at least 2.21, and most preferably of at least 2.24. Again, U-value herein is calculated according to NFRC 2010 at the center of the glazing (COG). And SHGC herein is calculated according to NFRC 2010, and is measured in this paragraph and otherwise herein in the out→in context of the IG window unit unless expressly stated otherwise. Example embodiments of this invention fulfill one or more of these needs, more preferably at least four or five of, and most preferably all six of these needs. In order to provide an advantageous combination of high visible transmission and high SHGC, in certain example embodiments of this invention, the ratio of the thickness of the bottom silver based IR reflecting layer to the thickness of the top silver based IR reflecting layer is from 0.30 to 0.50, more preferably from 0.38 to 0.47.

In certain example embodiments of this invention, there is provided an insulating glass (IG) window unit comprising: first and second glass substrates that are spaced apart from each other with a gap therebetween and substantially parallel to each other, wherein the first glass substrate is adapted to be at a building exterior and the second glass substrate is adapted to be closer to a building interior than is the first glass substrate; a low-E coating on a major surface of the second glass substrate facing said gap; the low-E coating comprising, moving away from the second glass substrate: (a) a dielectric layer comprising silicon nitride; (b) a dielectric layer comprising titanium oxide; (c) a first lower contact layer comprising zinc oxide; (d) a first IR reflecting layer comprising silver located over and directly contacting the first lower contact layer; (e) a first upper contact layer located over and directly contacting the first IR reflecting layer comprising silver; (f) a layer comprising zinc stannate; (g) a second lower contact layer comprising zinc oxide; (h) a second IR reflecting layer comprising silver located over and directly contacting the second lower contact layer; (i) a second upper contact layer located over and directly contacting the second IR reflecting layer comprising silver; and (j) a dielectric layer; wherein the low-E coating has only two IR reflecting layers comprising silver, and wherein the low-E coating has a normal emissivity of no greater than 0.04, and wherein the IG window unit has only two glass substrates; wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and wherein the IG window unit has each of: (i) a visible transmission of at least about 69.5%, (ii) an SHGC value of at least 0.50, (iii) an outside visible reflectance of no greater than 15%, (iv) a U-value of no greater than 0.253 BTU/hr-ft$^2$-° F., and (v) a ratio calculated as SHGC/U-Value of at least 2.0.

In certain example embodiments of this invention, there is provided an insulating glass (IG) window unit comprising: first and second glass substrates that are spaced apart from each other with a gap therebetween and substantially parallel to each other, wherein the first glass substrate is adapted to be at a building exterior and the second glass substrate is adapted to be closer to a building interior than is the first glass substrate; a low-E coating on a major surface of the second glass substrate facing said gap; the low-E coating comprising, moving away from the second glass substrate: (a) a dielectric layer; (b) a first lower contact layer comprising zinc oxide; (c) a first IR reflecting layer comprising silver located over and directly contacting the first lower contact layer; (d) a first upper contact layer located over and directly contacting the first IR reflecting layer comprising silver; (e) a layer comprising tin oxide and/or zinc stannate; (f) a second lower contact layer comprising zinc oxide; (g) a second IR reflecting layer comprising silver located over and directly contacting the second lower contact layer; (h) a second upper contact layer located over and directly contacting the second IR reflecting layer comprising silver; and (i) another dielectric layer; wherein the low-E coating has a normal emissivity of no greater than 0.04; wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and wherein the IG window unit has each of: (i) a visible transmission of at least about 69.5%, (ii) an SHGC value of at least 0.50, (iii) an outside visible reflectance of no greater than 15%, and (iv) a U-value of no greater than about 0.253 BTU/hr-ft$^2$-° F.

In certain example embodiments of this invention, there is provided an insulating glass (IG) window unit comprising: first and second glass substrates that are spaced apart from each other with a gap therebetween and substantially parallel to each other, wherein the first glass substrate is adapted to be at a building exterior and the second glass substrate is adapted to be closer to a building interior than is the first glass substrate; a low-E coating on a major surface of the second glass substrate facing said gap; the low-E coating comprising, moving away from the second glass substrate: a dielectric layer; a first lower contact layer comprising zinc oxide; a first IR reflecting layer comprising silver located over and directly contacting the first lower contact layer; a first upper contact layer located over and directly contacting the first IR reflecting layer comprising silver; a layer comprising tin oxide and/or zinc stannate; a second lower contact layer comprising zinc oxide; a second IR reflecting layer comprising silver located over and directly contacting the second lower contact layer; a second upper contact layer located over and directly contacting the second IR reflecting layer comprising silver; and another dielectric layer; wherein the low-E coating has a normal emissivity of no greater than 0.04; wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and wherein the IG window unit has each of: (i) a visible transmission of at least about 69.5%, (ii) an SHGC value of at least 0.50, (iii) an outside visible reflectance of no greater than 15%, and (iv) a ratio calculated as SHGC/U-Value of at least 2.20 (more preferably at least 2.24), where U-value is in units of BTU/hr-ft$^2$-° F.

DETAILED DESCRIPTION OF EXAMPLES OF THE INVENTION

Coated articles herein may be used in applications such as IG or monolithic window units.

Certain example embodiments of this invention relate to a low-E coating 30 used in connection with a coated article and/or IG window unit.

Figure 1:
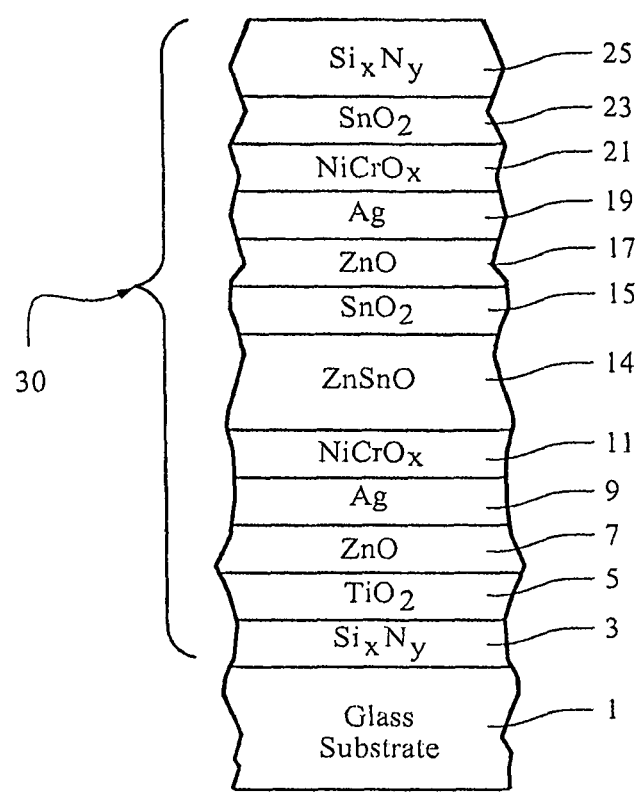
FIG. 1 is a cross sectional view of a coated article according to an example embodiment of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 30 provided on the substrate 1 either directly or indirectly. The low-E coating (or layer system) 30 is a double-silver low-E coating and includes: bottom silicon nitride inclusive dielectric layer 3 which may be Si$_3$N$_4$, of the Si-rich type for haze reduction, or of any other suitable stoichiometry in different embodiments of this invention, transparent dielectric layer 5 of or including titanium oxide (e.g., TiO$_2$ or any other suitable stoichiometry), transparent first lower contact layer 7 (which contacts bottom silver-based IR reflecting layer 9), first conductive and preferably metallic infrared (IR) reflecting layer 9 of or including silver, transparent first upper contact layer 11 (which contacts layer 9), transparent dielectric layer 14 of or including zinc stannate, transparent dielectric layer 15 of or including tin oxide, transparent second lower contact layer 17 (which contacts silver-based IR reflecting layer 19), second conductive and preferably metallic IR reflecting layer 19 of or including silver, transparent second upper contact layer 21 (which contacts layer 19), transparent dielectric layer 23, and transparent silicon nitride inclusive layer 25. The "contact" layers 7, 11, 17 and 21 each contact at least one infrared (IR) reflecting layer (e.g., layer based on Ag). The aforesaid layers 3-25 make up low-E (i.e., low emissivity) coating 30 which is provided on glass or plastic substrate 1. The layers 3-25 of coating 30 may be sputter-deposited on the substrate 1 in certain example embodiments of this invention.

Figure 2:
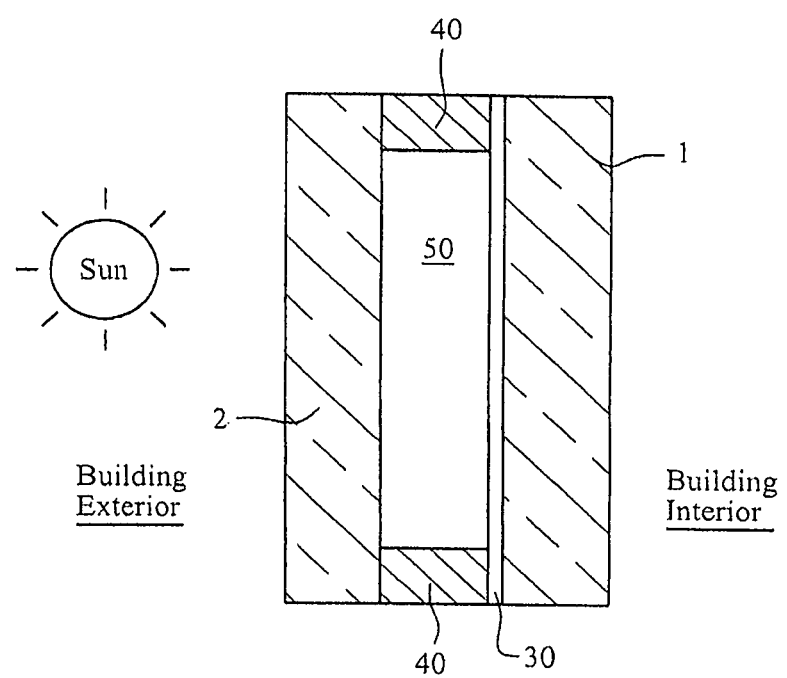
FIG. 2 is a cross sectional view of an IG window unit including the coated article of FIG. 1 on surface three of the IG window unit according to an example embodiment of this invention.

In monolithic instances, the coated article includes only one glass substrate 1 as illustrated in FIG. 1. However, monolithic coated articles herein may be used in devices such as IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. FIG. 2 shows an example IG window unit including the coated glass substrate 1 shown in FIG. 1 coupled to another glass substrate 2 via spacer(s), sealant(s)/spacer(s) 40 or the like, with a gap 50 being defined therebetween. This gap 50 between the substrates in IG window unit embodiments may in certain instances be filled with a gas such as argon (Ar). An example IG unit may comprise a pair of spaced apart clear glass substrates each about 3-4 mm thick, one of which is coated with a coating 30 herein in certain example instances, where the gap 50 between the substrates may be from about 5 to 30 mm, more preferably from about 10 to 20 mm, and most preferably about 12-13 mm or 16 mm. In certain example instances, the low-E coating 30 may be provided on surface three of the IG window unit as shown in FIG. 2. When the low-E coating 30 is on surface three, which is particularly desired in cold climates, the coating 30 is on the major surface of the inner substrate 1 that faces the gas-filled gap 50 as shown in FIG. 2. In alternative example embodiments the coating 30, or another coating, may be provided on surface two of the IG window unit which is the interior surface of glass substrate 2. Surface one of the IG window unit is at the building exterior, and surface four is at the building interior, as shown in FIG. 2.

Dielectric layers 3 and 25 may be of or include silicon nitride in certain embodiments of this invention. Silicon nitride layers 3 and 25 may, among other things, improve heat-treatability of the coated articles, e.g., such as thermal tempering or the like, and may or may not include some oxygen. The silicon nitride of layers 3 and/or 25 may be of the stoichiometric type (i.e., $Si_3N_4$), or alternatively of the Si-rich type in different embodiments of this invention. For example, Si-rich silicon nitride 3 (and/or 25) combined with zinc stannate 14 and/or tin oxide 15 under a silver based IR reflecting layer 19 may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during heat treatment (HT) to be more efficiently stopped by the Si-rich silicon nitride inclusive layer before they can reach the silver and damage the same.

In certain example embodiments, when Si-rich silicon nitride is used in layer 3 and/or 25, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). It has also surprisingly been found that using Si-rich silicon nitride, with a refractive index "n" of from 2.1 to 2.2 for layer 3, results in more neutral transmitted and reflected coloration of the coated article and IG window unit. Any and/or all of the silicon nitride layers 3, 25 discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in an atmosphere including at least nitrogen gas in certain embodiments of this invention. Small amounts of oxygen may also be provided in layer(s) 3 and/or 25.

Infrared (IR) reflecting layers 9 and 19 are preferably substantially or entirely metallic and/or conductive, and may comprise or consist essentially of silver (Ag). IR reflecting layers 9 and 19 help allow the coating to have low-E and/or good solar control characteristics. The IR reflecting layers may, however, be slightly oxidized in certain embodiments of this invention and may be doped with other element(s) in addition to the silver.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized (i.e., sub-oxide). In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer. For example, a contact layer 11 and/or 21 may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire underlying IR reflecting layer.

Dielectric layer 15 may be of or include tin oxide in certain example embodiments of this invention. However, it may be doped with certain other materials in other example embodiments, such as with Al or Zn in certain example alternative embodiments. Moreover, zinc stannate inclusive layer 14 may be omitted, or replaced with a tin oxide based layer (e.g., which may be doped with Al or the like), or may be doped with other material(s) such as Al, Nb, Bi or the like, in certain example embodiments of this invention. Additionally, transparent dielectric layer 15 may be of or include tin oxide as explained herein, and may be doped with other material(s) such as Al, Bi, and/or Nb. Alternatively, transparent dielectric layer 15 may be of or include niobium oxide (instead of tin oxide) in certain example embodiments of this invention, which may or may not be doped with other material(s).

Dielectric layer 5 of or including titanium oxide (e.g., $TiO_2$ or any other suitable stoichiometry) is provided for optical purposes, and its position between silicon nitride inclusive layer 3 and zinc oxide based layer 7 is helpful for antireflective purposes. Likewise, the two Ag based layers 9, 19 are also beneficial for antireflective purposes.

Lower contact layers 7 and/or 17 in certain embodiments of this invention are of or include zinc oxide (e.g., ZnO). The zinc oxide of layers 7 and/or 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al. In certain example embodiments, the lower contact layer 7 comprising ZnO and/or ZnAlO is thicker than the upper contact layer 17 comprising ZnO and/or ZnAlO by at least about 30 Å, more preferably by at least about 50 Å.

Zinc stannate based layer 14 is provided under and contacting layer 15 comprising tin oxide, and over and possibly contacting contact layer 11, in a central portion of the layer stack between first and second IR reflecting layers 9 and 19. In certain example embodiments, it is possible to dope the zinc stannate based layer 14 and/or tin oxide based layer 15 with other materials such as Al, Zn, N, or the like.

Dielectric layer 23 may be of or include tin oxide in certain example embodiments of this invention. However, layer 23 is optional and need not be provided in certain example embodiments of this invention. Dielectric layer 25 may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during optional heat treatment and/or environmental use. In certain example embodiments, layer 25 may have an index of refraction (n) of from about 1.9 to 2.2, more preferably from about 1.95 to 2.05. Optionally, the provision of an overcoat layer of or including zirconium oxide (not shown) as an overcoat for the coating 30 can reduce and/or eliminate certain thermal stability issues.

In certain example embodiments, it has been found that good optical properties are achieved when the total thickness of the combination of zinc stannate based layer 14 and tin oxide inclusive layer 15 is from about 600 to 900 Å, more preferably from about 700 to 800 Å. All layer thicknesses referred to herein are physical thicknesses. In certain example embodiments, zinc stannate based layer 14 is substantially thicker than is tin oxide based layer 15. For example, in certain example embodiments, zinc stannate layer 14 is thicker than tin oxide based layer 15 by at least about 300 Å, more preferably by at least 400 or 500 Å. Each of layers 14 and 15 is substantially thicker than contact layer 11 in certain example embodiments of this invention. For example, in certain example embodiments, zinc stannate based layer 14 and tin oxide based layer 15 are each thicker than contact layer 11 by at least about 40 Å, more preferably by at least 50 Å.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. For example, layer 5 may be removed in example embodiments of this invention. As another example, a layer of or including silicon nitride may be provided on either side of layer 15 in example embodiments of this invention.

Figure 3:
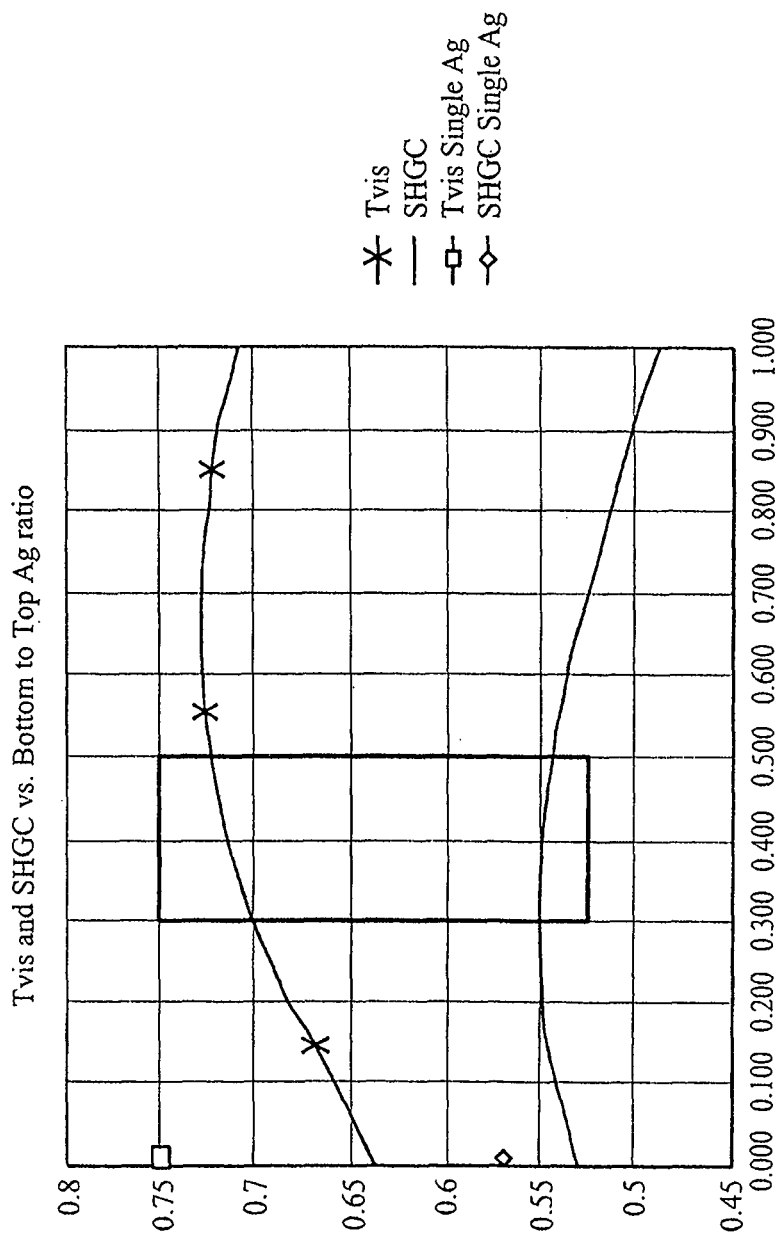
FIG. 3 is a graph plotting bottom/top silver based layer ratio for the horizontal axis values vs. SHGC and visible transmission (Tvis) for the vertical axis values, including a plot (upper contour line) for Tvis values and a plot (lower contour line) for SHGC values.

Referring to FIG. 3, analysis of double-silver low-E coatings demonstrates that there is a peak area for SHGC that is based on the thickness ratio of the bottom silver-based layer 9 to the top silver based layer 19. It has been found that the highest SHGC for a double-silver low-E coating is realized in an area where the ratio of the physical thickness of the bottom silver-based layer 9 to the physical thickness of the top silver-based layer 19 is from 0.20 to 0.50. However, the visible transmission of the coating is rather low in the area where this ratio is from 0.20 to 0.30. Thus, it has been found that the optimum results for high visible transmission in combination with high SHGC are achieved in the range where the ratio of the physical thickness of the bottom silver-based layer 9 to the physical thickness of the top silver-based layer 19 is from 0.30 to 0.50 (see the rectangular box in FIG. 3). This is particularly desirable for applications in cold climates as explained herein. Thus, in certain example embodiments of this invention, desirable thermal and optical characteristics are achieved utilizing this range in combination with other factors discussed herein. Thus, in preferred embodiments of this invention, the ratio of the thickness of the bottom IR reflecting layer 9 to the thickness of the top IR reflecting layer 19 is from 0.30 to 0.50, more preferably from 0.38 to 0.47. For example, if the bottom silver based IR reflecting layer 9 is 52 Å thick and the upper/top silver based IR reflecting layer 19 is 116 Å thick, then the ratio of the thickness of the bottom IR reflecting layer 9 to the thickness of the top IR reflecting layer 19 is 0.45 which is within the preferred range.

The IG unit of FIG. 2, which includes the coated article of FIG. 1 as described above, has surprisingly been found to be able to achieve a combination of the following advantageous features which are particularly desirable in cold climate applications: (i) an IG window unit having high visible transmission such as at least about 70%, (ii) an IG window unit having a high SHGC value such as at least 0.50, more preferably at least 0.52, more preferably at least 0.54, even more preferably at least 0.56, with an example range being from about 0.50 to 0.60, in the out→in context of the IG window unit when the low-E coating is on surface three of the IG window unit as shown in FIG. 2, (iii) an IG window unit having a low outdoor/outside reflectance such as no greater than 15%, such as the low-E coating realizing low film-side reflectance when used on surface three of an IG window unit so that reflectance as viewed from the outside of the building is small, (iv) low emissivity and/or low sheet resistance, such as normal emissivity of no greater than 4% and more preferably no greater than 3%, (v) an IG window unit having an acceptable U-value such as a double glazing IG window unit with one low-E coating having a U-value of no greater than 0.253, more preferably no greater than 0.251, even more preferably no greater than 0.249, with an example range being from 0.244 to 0.253, more preferably from about 0.244 to 0.251, and (vi) a high SHGC to U-value ratio, calculated as SHGC/U-Value, of at least 2.0, more preferably of at least 2.10, even more preferably of at least 2.15, even more preferably of at least 2.20, even more preferably at least 2.21, and most preferably of at least 2.24.

While the IG unit of FIG. 1 is preferably used on surface three of an IG window unit as shown in FIG. 2, the coating of FIG. 1 may also be used on surface two of an IG window unit in certain example embodiments of this invention. The U-value (U-factor) would not be affected between surface two and surface three, and in an example where the coating 30 is on surface two of the IG window unit (on the interior surface of substrate 2 facing gap 50) the unit could have an SHGC of about 0.468 or the like.

While various thicknesses and materials may be used in layers in different embodiments of this invention, example thicknesses and materials for the respective layers on the glass substrate 1 in the FIG. 1-2 embodiment are as follows, from the glass substrate outwardly:

| Example Materials/Thicknesses; FIG. 1-2 Embodiment | | | |
|---|---|---|---|
| Layer Glass (1-10 mm thick) | Preferred Range (Å) | More Preferred (Å) | Example (Å) |
| $Si_xN_y$ (layer 3) | 40-450 Å | 130-250 Å | 180 Å |
| $TiO_x$ (layer 5) | 40-250 Å | 60-110 Å | 80 Å |
| $ZnAlO_x$ (layer 7) | 100-180 Å | 130-170 Å | 150 Å |
| Ag (layer 9) | 40-75 Å | 45-65 Å | 52 Å |
| $NiCrO_x$ (layer 11) | 10-60 Å | 25-40 Å | 30 Å |
| ZnSnO (layer 14) | 300-900 Å | 550-800 Å | 650 Å |
| $SnO_2$ (layer 15) | 40-250 Å | 50-150 Å | 100 Å |
| $ZnAlO_x$ (layer 17) | 50-120 Å | 70-95 Å | 82 Å |
| Ag (layer 19) | 85-145 Å | 105-130 Å | 116 Å |
| $NiCrO_x$ (layer 21) | 10-60 Å | 20-40 Å | 30 Å |
| $SnO_2$ (layer 23) | 0-500 Å | 150-270 Å | 220 Å |
| $Si_3N_4$ (layer 25) | 100-450 Å | 150-260 Å | 210 Å |

In certain example embodiments of this invention (e.g., see FIGS. 1-2), coated articles herein may have the following optical and solar characteristics when measured monolithically (before any optional HT). The sheet resistances ($R_s$) and emissivity values herein take into account all IR reflecting layers (e.g., silver layers 9, 19). In the chart below, as will be appreciated by those skilled in the art, "f" refers to film side and "g" refers to glass side and "t" stands for transmissive, while R refers to reflectance.

| Optical/Solar Characteristics (Monolithic; pre-HT) | | |
|---|---|---|
| Characteristic | General | More Preferred |
| $R_s$ (ohms/sq.): | <=5.0 | <=4.0 |
| $E_n$: | <=0.04 (4%) | <=0.03 (3%) |
| $T_{vis}$ (or TY)(Ill. C 2°): | >=70% | >=76% |
| $a^*_t$ (Ill. C 2°): | −4.0 to +1.0 | −2.5 to 0 |
| $b^*_t$ (Ill. C 2°): | 0 to +5.0 | +1.0 to +3.5 |
| $R_fY$ (Ill. C, 2 deg.): | <=8% | <=6.5% or <=5.0% |
| $a^*_f$ (Ill. C, 2°): | −6.0 to +5.0 | −5.0 to +3.0 |
| $b^*_f$ (Ill. C, 2°): | −15.0 to 0 | −12.0 to 0 |
| $R_gY$ (Ill. C, 2 deg.): | <=11% | <=9.5% |
| $a^*_g$ (Ill. C, 2°): | −6.0 to +2.0 | −4.0 to +1.0 |
| $b^*_g$ (Ill. C, 2°): | −20.0 to 0 | −15.0 to −3.0 |

Note the low film side visible reflectance values ($R_fY$) in the chart above, which can be achieved by example embodiments of this invention, which are particularly desirable in cold climates where the low-E coating is used on surface three of an IG window unit. In certain example embodiments, measured monolithically, film side visible reflectance ($R_fY$) is lower than glass side visible reflectance ($R_gY$) which is particularly desirable in such cold climate applications.

When the monolithic coated article is provided in an IG window unit, on surface three as shown in FIG. 2, the IG window unit in certain example embodiments of this invention (e.g., see FIGS. 1-2) may have the following optical and solar characteristics.

| Optical/Solar Characteristics (IG Unit; non-HT) | | |
|---|---|---|
| Characteristic | General | More Preferred |
| $R_s$ (ohms/sq.): | <=5.0 | <=4.0 |
| $E_n$: | <=0.04 (4%) | <=0.03 (3%) |
| SHGC (outside→in): | 0.50 to 0.60 | 0.53 to 0.60 |
| SHGC (inside→out): | 0.40 to 0.50 | 0.45 to 0.49 |
| U-value (winter/COG): | 0.230 to 0.253 | 0.244 to 0.251 BTU/hr-ft²-° F. |
| $T_{vis}$ (or TY)(Ill. C 2°): | >=69.5% | >=71% |
| $a^*_t$ (Ill. C 2°): | −4.0 to +1.0 | −3.0 to 0 |
| $b^*_t$ (Ill. C 2°): | 0 to +5.0 | +1.0 to +3.5 |
| $R_{outside}Y$ (Ill. C, 2 deg.): | <=15% | <=14% |
| $a^*_{outside}$ (Ill. C, 2°): | −5.0 to +4.0 | −3.0 to +2.0 |
| $b^*_{outside}$ (Ill. C, 2°): | −10.0 to 0 | −8.0 to 0 |
| $R_{inside}Y$ (Ill. C, 2 deg.): | <=17% | <=15% |
| $a^*_{inside}$ (Ill. C, 2°): | −4.5 to +2.0 | −3.5 to −0.5 |
| $b^*_{inside}$ (Ill. C, 2°): | −15.0 to 0 | −11.0 to −1.0 |

Note the low visible reflectance values to be viewed from the outside of the building ($R_{outside}Y$) in the chart above, which can be achieved by example embodiments of this invention, which are particularly desirable in cold climates where the low-E coating is used on surface three of an IG window unit. In certain example embodiments, visible reflectance to be viewed from the outside of the building in which the IG unit is to be mounted ($R_{outside}Y$) is lower than the visible reflectance ($R_{inside}Y$) to be viewed from the inside of the building.

The following example is provided for purposes of example only, and is not intended to be limiting unless specifically claimed.

EXAMPLE 1

The following Example was made via sputtering on a 3.0 mm thick clear glass substrate 1 so as to have approximately the layer stack set forth below. This example is according to an example embodiment of this invention as shown in FIG. 1. The thicknesses are in units of angstroms (Å) and are approximations.

| Layer Glass Substrate | Example 1 |
|---|---|
| $Si_xN_y$ | 150 |
| $TiO_2$ | 108 |
| ZnAlO | 150 |
| Ag | 56 |
| $NiCrO_x$ | 30 |
| ZnSnO | 650 |
| $SnO_2$ | 100 |
| ZnAlO | 82 |
| Ag | 116 |
| $NiCrO_x$ | 30 |
| $SnO_2$ | 220 |
| $Si_3N_4$ | 220 |

The coated article of Example 1 had the following characteristics measured monolithically:

| Optical/Solar Characteristics (Ex. 1 monolithic; pre-HT) | |
|---|---|
| Characteristic | Value |
| $T_{vis}$ (or TY)(Ill. C 2°): | 79.5% |
| $a^*_t$ (Ill. C 2°): | −1.01 |
| $b^*_t$ (Ill. C 2°): | +2.32 |
| $R_fY$ (Ill. C, 2 deg.): | 6.1% |
| $a^*_f$ (Ill. C, 2°): | +1.8 |
| $b^*_f$ (Ill. C, 2°): | −9.78 |
| $R_gY$ (Ill. C, 2 deg.): | 8.8% |
| $a^*_g$ (Ill. C, 2°): | −0.69 |
| $b^*_g$ (Ill. C, 2°): | −12.56 |

After being sputter deposited onto the glass substrate as shown in FIG. 1, the Example coated article was not thermally tempered and was provided on surface three of an IG window unit as shown in FIG. 2, where the second glass substrate 2 was uncoated, clear and 3 mm thick. The gap 50 between the glass substrates 1 and 2 of the IG window unit was 90% argon gas and 10% air filled, and was about 13 mm thick/wide. The IG unit had the following characteristics:

| Optical/Solar Characteristics (Ex. 1 IG Unit; non-HT) | |
|---|---|
| Characteristic | Value |
| SHGC (outside→in): | 0.548 |
| SHGC (inside→out): | 0.470 |
| U-value (winter/COG): | 0.247 BTU/hr-ft²-° F. |
| LSG (outside→in): | 1.32 |
| LSG (inside→out): | 1.53 |
| $T_{vis}$ (or TY)(Ill. C 2°): | 72.1% |
| $a^*_t$ (Ill. C 2°): | −1.64 |
| $b^*_t$ (Ill. C 2°): | +2.22 |
| $R_{outside}Y$ (Ill. C, 2 deg.): | 13.1% |
| $a^*_{outside}$ (Ill. C, 2°): | +0.35 |
| $b^*_{outside}$ (Ill. C, 2°): | −5.46 |
| $R_{inside}Y$ (Ill. C, 2 deg.): | 14.0% |
| $a^*_{inside}$ (Ill. C, 2°): | −1.05 |
| $b^*_{inside}$ (Ill. C, 2°): | −9.09 |

This performance, including the combination of low U-value, high visible transmission, high SHGC, and low outside reflectance, is better than any known product on the market as of the filing of this application.

In certain example embodiments of this invention, there is provided an insulating glass (IG) window unit comprising: first and second glass substrates that are spaced apart from each other with a gap therebetween and substantially parallel to each other, wherein the first glass substrate is adapted to be at a building exterior and the second glass substrate is adapted to be closer to a building interior than is the first glass substrate; a low-E coating on a major surface of the second glass substrate facing said gap; the low-E coating comprising, moving away from the second glass substrate: (a) a dielectric layer comprising silicon nitride; (b) a dielectric layer comprising titanium oxide; (c) a first lower contact layer comprising zinc oxide; (d) a first IR reflecting layer comprising silver located over and directly contacting the first lower contact layer; (e) a first upper contact layer located over and directly contacting the first IR reflecting layer comprising silver; (h) a layer comprising zinc stannate; (g) a second lower contact layer comprising zinc oxide; (h) a second IR reflecting layer comprising silver located over and directly contacting the second lower contact layer; (i) a second upper contact layer located over and directly contacting the second IR reflecting layer comprising silver; and (j) a dielectric layer; wherein the low-E coating has only two IR reflecting layers comprising silver, and wherein the low-E coating has a normal emissivity of no greater than 0.04, and wherein the IG window unit has only two glass substrates; wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and wherein the IG window unit has each of: (i) a visible transmission of at least about 69.5%, (ii) an SHGC value of at least 0.50, (iii) an outside visible reflectance of no greater than 15%, (iv) a U-value of no greater than 0.253 BTU/hr-ft$^2$-° F., and (v) a ratio calculated as SHGC/U-Value of at least 2.0.

In the IG window unit of the immediately preceding paragraph, the low-E coating may have a sheet resistance ($R_s$) of less than or equal to 4.0 ohms/square.

The IG window unit of any of the preceding two paragraphs may optionally have an SHGC value of at least 0.52, more preferably of at least 0.54, and even more preferably of at least 0.56.

The IG window unit of any of the preceding three paragraphs may optionally have an SHGC value of from 0.50 to 0.60.

The IG window unit of any of the preceding four paragraphs may optionally have only one low-E coating (i.e., not multiple low-E coatings on multiple surfaces).

The IG window unit of any of the preceding five paragraphs may optionally have a U-value of no greater than 0.253, even more preferably no greater than 0.249, with an example range from 0.244 to 0.253 BTU/hr-ft$^2$-° F.

The IG window unit of any of the preceding six paragraphs may optionally have a ratio calculated as SHGC/U-Value of at least 2.10, more preferably of at least 2.20, and most preferably of at least 2.24.

In the IG window unit of any of the preceding seven paragraphs, one or both of the first and second upper contact layers may comprise an oxide of Ni and/or Cr (e.g., NiCrOx).

The IG window unit of any of the preceding eight paragraphs may optionally further comprise: (a) a layer comprising tin oxide located between and directly contacting the layer comprising zinc stannate and the second lower contact layer comprising zinc oxide, or (b) a layer comprising niobium oxide located between and directly contacting the layer comprising zinc stannate and the second lower contact layer comprising zinc oxide. Regarding (a) for example, the layer comprising tin oxide may be doped with other material such as Al, Bi or the like.

In the IG window unit of any of the preceding nine paragraphs the dielectric layer comprising titanium oxide may be located under and directly contacting the first lower contact layer comprising zinc oxide.

The IG window unit of any of the preceding ten paragraphs the dielectric layer located over the second upper contact layer may comprise tin oxide and/or silicon nitride.

In certain example embodiments of this invention, there is provided an insulating glass (IG) window unit comprising: first and second glass substrates that are spaced apart from each other with a gap therebetween and substantially parallel to each other, wherein the first glass substrate is adapted to be at a building exterior and the second glass substrate is adapted to be closer to a building interior than is the first glass substrate; a low-E coating on a major surface of the second glass substrate facing said gap; the low-E coating comprising, moving away from the second glass substrate: (a) a dielectric layer; (b) a first lower contact layer comprising zinc oxide; (c) a first IR reflecting layer comprising silver located over and directly contacting the first lower contact layer; (d) a first upper contact layer located over and directly contacting the first IR reflecting layer comprising silver; (e) a layer comprising tin oxide and/or zinc stannate; (f) a second lower contact layer comprising zinc oxide; (g) a second IR reflecting layer comprising silver located over and directly contacting the second lower contact layer; (h) a second upper contact layer located over and directly contacting the second IR reflecting layer comprising silver; and (i) another dielectric layer; wherein the low-E coating has a normal emissivity of no greater than 0.04; wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and wherein the IG window unit has each of: (i) a visible transmission of at least about 69.5%, (ii) an SHGC value of at least 0.50, (iii) an outside visible reflectance of no greater than 15%, and (iv) a U-value of no greater than 0.253 BTU/hr-ft$^2$-° F.

The IG window unit of the immediately preceding paragraph may optionally have a ratio calculated as SHGC/U-Value of at least 2.0.

The IG window unit of any of the preceding two paragraphs may optionally have an SHGC value of at least 0.52, more preferably of at least 0.54, and most preferably of at least 0.56.

The IG window unit of any of the preceding three paragraphs may optionally have only one low-E coating.

The IG window unit of any of the preceding four paragraphs may optionally have a U-value of no greater than 0.251 BTU/hr-ft$^2$-° F.

The IG window unit of any of the preceding five paragraphs may optionally have a ratio calculated as SHGC/U-Value of at least 2.10, more preferably of at least 2.20, and still more preferably of at least 2.24. For example, an example of this invention has a U-value of 0.251 and an SHGC of 0.57, which results in a ratio SHGC/U-Value of 2.27.

In the IG window unit of any of the preceding six paragraphs, both of the first and second upper contact layers may comprise an oxide of Ni and/or Cr.

In the IG window unit of any of the preceding seven paragraphs the layer comprising tin oxide and/or zinc stannate may comprise or consist essentially of zinc stannate and may be located between and contacting the first upper contact layer and a layer comprising tin oxide.

In the IG window unit of any of the preceding eight paragraphs the low-E coating may further comprise a layer comprising titanium oxide located between the first IR reflecting layer and the second glass substrate.

In the IG window unit of any of the preceding nine paragraphs the ratio of the thickness of the first IR reflecting layer comprising silver to the thickness of the second IR reflecting layer comprising silver, calculated as the thickness of the first IR reflecting layer comprising silver divided by the thickness of the second IR reflecting layer comprising silver, may be from 0.38 to 0.47.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a low-emissivity (low-E) coating on a substrate, the low-E coating comprising, moving away from the substrate:
    a dielectric layer;
    a dielectric layer comprising metal oxide;
    a first lower contact layer;
    a first IR reflecting layer comprising silver located over and directly contacting the first lower contact layer;
    a first upper contact layer comprising metal oxide located over and directly contacting the first IR reflecting layer comprising silver;
    a layer comprising zinc stannate located over and directly contacting the first upper contact layer comprising metal oxide;
    a layer consisting essentially of tin oxide located over and directly contacting the layer comprising zinc stannate;
    a second lower contact layer consisting essentially of zinc oxide, which may optionally be doped with aluminum, located over and directly contacting the layer consisting essentially of tin oxide;
    wherein a total thickness of the layer comprising zinc stannate and the layer consisting essentially of tin oxide is from 600-900 Å;
    a second IR reflecting layer comprising silver located over and directly contacting the second lower contact layer;
    a second upper contact layer located over and directly contacting the second IR reflecting layer comprising silver; and
    a dielectric layer;
    wherein the low-E coating has only two IR reflecting layers comprising silver, and wherein the low-E coating has a normal emissivity of no greater than 0.04;
    wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and
    wherein the coated article, measured monolithically, has a visible transmission of at least about 70% and/or a film side visible reflectance of no greater than 6.5%.

2. An IG window unit comprising the coated article of claim 1.

3. A coated article including a low-emissivity (low-E) coating on a substrate, the low-E coating comprising, moving away from the substrate:
    a dielectric layer;
    a dielectric layer comprising metal oxide;
    a first lower contact layer;
    a first IR reflecting layer comprising silver located over and directly contacting the first lower contact layer;
    a first upper contact layer comprising metal oxide located over and directly contacting the first IR reflecting layer comprising silver;
    a layer comprising zinc stannate located over and directly contacting the first upper contact layer comprising metal oxide;
    a layer consisting essentially of tin oxide located over and directly contacting the layer comprising zinc stannate;
    a second lower contact layer consisting essentially of zinc oxide, which may optionally be doped with aluminum, located over and directly contacting the layer consisting essentially of tin oxide;
    wherein a total thickness of the layer comprising zinc stannate and the layer consisting essentially of tin oxide is from 600-900 Å;
    a second IR reflecting layer comprising silver located over and directly contacting the second lower contact layer;
    a second upper contact layer located over and directly contacting the second IR reflecting layer comprising silver; and
    a dielectric layer;
    wherein the low-E coating has only two IR reflecting layers comprising silver;
    wherein a ratio of a thickness of the first IR reflecting layer comprising silver to a thickness of the second IR reflecting layer comprising silver, calculated as the thickness of the first IR reflecting layer comprising silver divided by the thickness of the second IR reflecting layer comprising silver, is from 0.30 to 0.50; and
    wherein the coated article, measured monolithically, has a visible transmission of at least about 70% and/or a film side visible reflectance of no greater than 6.5%.

4. The coated article of claim 3, wherein the coated article, measured monolithically, has both a visible transmission of at least about 70% and a film side visible reflectance of no greater than 6.5%.

5. An IG window unit comprising the coated article of claim 4.

6. The coated article of claim 3, wherein the first lower contact layer comprises zinc oxide.

7. The coated article of claim 3, wherein the first upper contact layer comprises oxide of Ni and Cr.

8. The coated article of claim 3, wherein the second upper contact layer comprises oxide of Ni and Cr.

9. The coated article of claim 8, wherein the first upper contact layer comprises oxide of Ni and Cr.

* * * * *